United States Patent [19]

Harshe et al.

[11] Patent Number: 5,687,056
[45] Date of Patent: Nov. 11, 1997

[54] VARIABLE VOLTAGE, VARIABLE CAPACITANCE CHIP CAPACITOR DEVICE HAVING LEAD PINS ELECTRICALLY COUPLED TO CAPACITOR SUBASSEMBLY

[75] Inventors: Girish R. Harshe, Wheeling; Darioush Keyvani, Chicago; Sanjay Goel, Schaumburg, all of Ill.

[73] Assignee: Motorola, Inc., Schaumburg, Ill.

[21] Appl. No.: 699,267

[22] Filed: Aug. 19, 1996

[51] Int. Cl.$^6$ ........................................ H01G 4/38
[52] U.S. Cl. .............. 361/328; 361/301.4; 361/522; 361/541; 361/763; 361/504; 257/303
[58] Field of Search .................. 361/301.4, 306.1, 361/306.3, 307, 308.1, 313, 322, 328, 508, 512, 516, 520, 522, 523, 525, 528, 532, 541, 763, 790; 257/777, 303

[56] References Cited

U.S. PATENT DOCUMENTS 5,072,329  12/1991  Galvagni ........................ 361/321
5,555,155   9/1996  Patel et al. ...................... 361/503
5,587,872  12/1996  Lian et al. ....................... 361/525

FOREIGN PATENT DOCUMENTS 0 078 404  9/1982  European Pat. Off. ....... H01M 14/00

Primary Examiner—Leo P. Picard
Assistant Examiner—Anthony Dinkins
Attorney, Agent, or Firm—Kenneth M. Massaroni

[57] ABSTRACT

An electrochemical capacitor chip device (10) includes a plurality of capacitor subassemblies (12, 14, 16, 18, 20, and 22) arranged in stacked configuration. Each stacked capacitor assembly shares a single common electrode (48) from which extends a contact tab. Attached to contact tabs are lead pins (26, 28, 30 and 32) for effecting electrical and mechanical communication with, for example, a printed circuit board. The capacitor subassemblies may be preferably fabricated of electrochemical capacitor subassemblies employing gelled polymeric electrolyte structures.

12 Claims, 2 Drawing Sheets

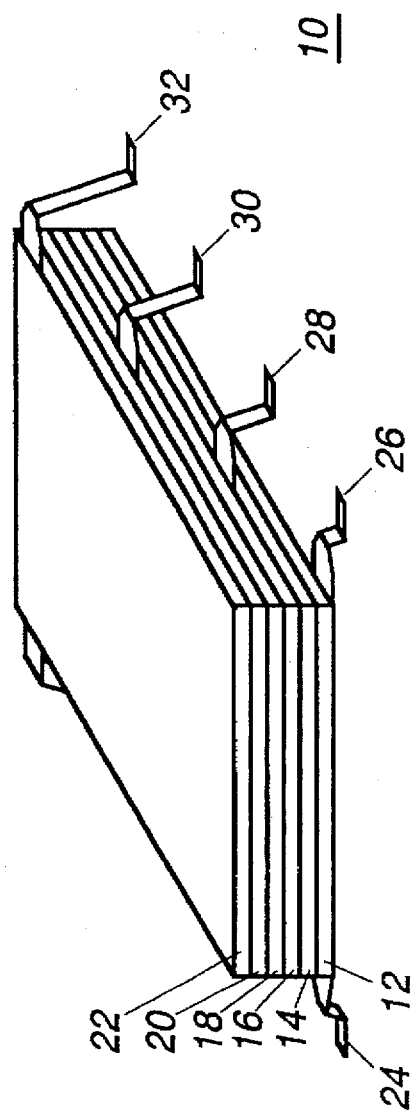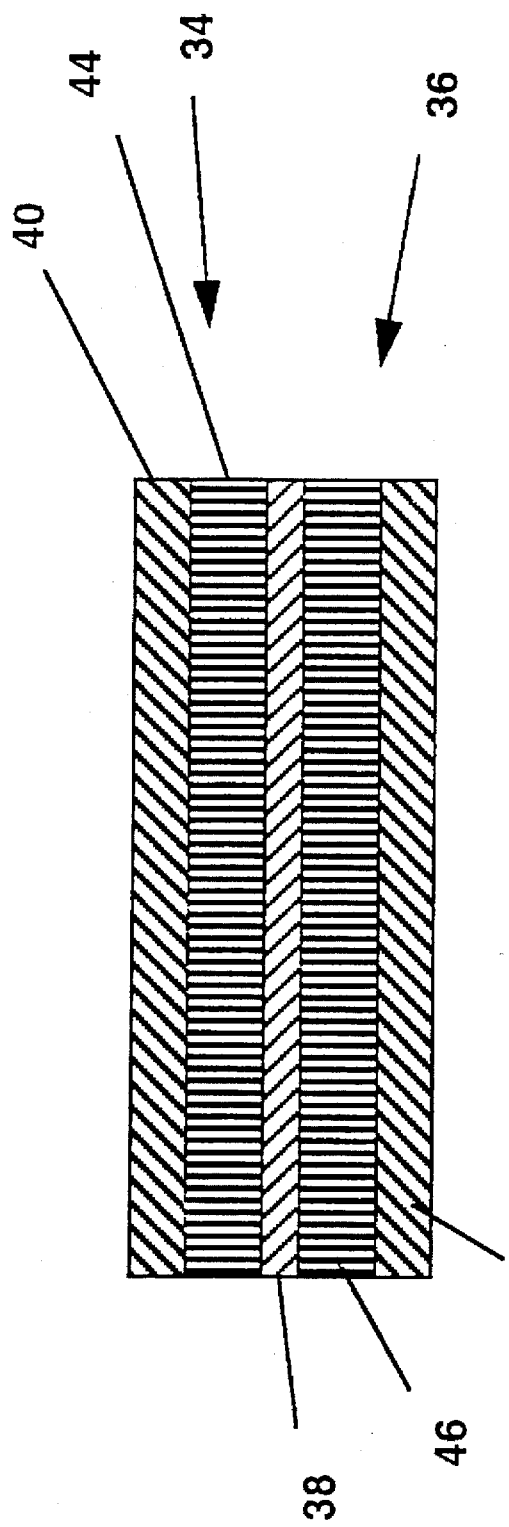

VARIABLE VOLTAGE, VARIABLE CAPACITANCE CHIP CAPACITOR DEVICE HAVING LEAD PINS ELECTRICALLY COUPLED TO CAPACITOR SUBASSEMBLY

TECHNICAL FIELD

This invention relates in general to packages for electrical components, and in particular to a package for a variable voltage, variable capacitance electrochemical capacitor chip.

BACKGROUND OF THE INVENTION

Modern electrical devices are assembled from a wide variety of components. Many different sizes and package shapes are available for each of these components. However, as devices are increasingly made smaller and more portable, it is desirable to choose components that facilitate both small size and feature set. In many devices, a common circuit element is capacitor, which is typically used in a number of different functions within a given device. Accordingly, a number of different capacitors are often necessary, each tailored to a particular voltage or capacitance value, depending upon its function within the device. Individual capacitor components tend to be relatively large, and as many may be necessary for a particular device, take up a large portion of the available space within the given device.

Moreover, capacitors tend to be difficult to handle during assembly, compared to other circuit components, such as resistors and integrated circuit packages. This is owing to the fact that capacitors are typically cylindrically shaped cans, as opposed to the more square-shaped circuit package typically associated with, for example, memory devices and microprocessors. Material handling is a critical manufacturing process, and considerations need to be taken to ensure high yields. Due to the relatively large size of capacitors, these components typically require a different process for assembly into a device than other smaller components. In many electronic devices, the capacitors may be the only leaded components, the balance being surface-mounted type components. It would thus be desirable to reduce both the extra number of components necessary, as well as the extra processes required to assemble the package including these types of devices.

Thus, there exists a need for a packaging system for variable voltage and variable capacitance electrochemical capacitor devices. The packaging system should reduce the overall space required for these components, while providing the ability to vary the performance characteristics of the device so packaged. Such a device should also be packaged so as to facilitate easy assembly into electronic devices, taking advantage of economical manufacturing processes such as surface mounting.

BRIEF DESCRIPTION OF THE DRAWINGS

FIG. 1 is a perspective view of the unitary packaging system in accordance with the instant invention;

FIG. 2 is a partial cross-sectional sideview of a chip capacitor in accordance with the instant invention.

DETAILED DESCRIPTION OF THE PREFERRED EMBODIMENT

Figure 5:
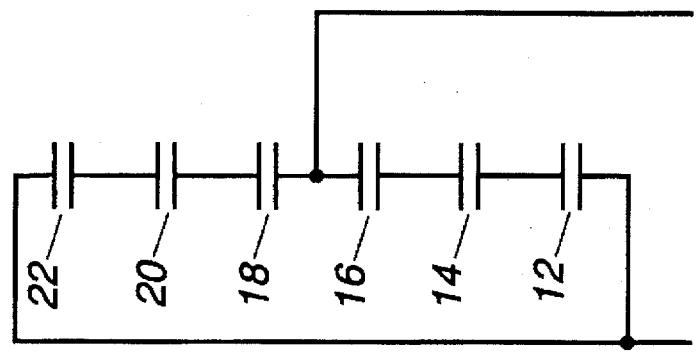
FIGS. 3-5 are a series of circuit diagrams for a chip capacitor in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a perspective view of an electrochemical chip capacitor in accordance with the instant invention. The electrochemical chip capacitor is a leaded chip capacitor device which comprises a plurality of capacitor subassemblies arranged in a stacked configuration. Each capacitor subassembly includes at least an anode, a cathode, and a layer of electrolyte material disposed therebetween. The anode and cathode materials are disposed upon current collecting layers, said current collecting layers including lead tabs and lead pins for effecting electrical and/or mechanical communication to, for example, a printed circuit board.

Referring now to FIG. 1, a leaded chip capacitor device 10 comprises six stacked capacitor subassemblies 12, 14, 16, 18, 20, and 22. The six capacitor subassemblies will thus include seven leaded contacts, only five of which are visible in the respective embodiment of FIG. 1. The leaded contacts 24, 26, 28, 30, and 32 are adapted to connect both electrically and mechanically the device 10 to an application device, such as a radio, cellular phone, or computer, to name a few. Each of the capacitor subassemblies 12-22 are essentially identical; hence, only device 22 will be illustrated.

The capacitor subassembly includes first and second electrode assemblies 34 and 36 with a layer of a electrolyte active material 38 disposed therebetween. The electrode assemblies 34 and 36 may be essentially identical, or symmetric in that they are fabricated from the same materials. Alternatively, they may be fabricated of a different material and hence be considered to be asymmetric. Each electrode assembly is fabricated of a current collecting substrate, for example, substrates 40 and 42 upon which are deposited layers of electrode active material, for example, 44 and 46. The selection of the electrode active materials, the substrate materials and the electrolyte active material, all dependent upon the device performance characteristics required for a particular application. Hence, any number of material systems may be advantageously employed in connection with the subject patent application.

In one preferred embodiment, the capacitor device is fabricated of a plurality of symmetric capacitor subassemblies. In this embodiment, both substrates 40 and 42 are fabricated of titanium or a modified titanium material such as that disclosed in commonly assigned copending subject patent application Ser. No. 08/586,619 filed Feb. 1, 1996 in the names of Bai, et al., the disclosure of which is incorporated herein by reference. Disposed atop each of the substrates in this embodiment, is a layer of electrode active material. In this embodiment, the electrode active material is an oxide of ruthenium. However, it is to be understood that other types of materials may be employed equally advantageously. Examples of such other materials include iridium, tantalum, rhodium, cobalt, nickel, molybdenum, tungsten, vanadium, titanium, chromium, manganese, palladium, copper, silver, rhenium, osmium, platinum, gold, oxides thereof, and combinations thereof. Alternatively, the electrode active materials may be fabricated of conductive polymeric materials, examples of which include polyurethane, polypyrrole, polyvinylidene fluoride, polyaniline and combinations thereof.

Regardless of the types of materials used for the electrode assemblies 34 and 36, disposed therebetween is a layer of an electrolyte material. The electrolyte material may be any of a number of materials which are known in the art, including liquids, solids, gels, aqueous and non-aqueous systems, and combinations thereof. In the preferred embodiment of the instant invention, the electrolyte active species is a gelled polymeric electrolyte active species, in which an electrolyte active material is dispersed in a polymeric support structure. The polymeric support structure is designed to impart both conductivity and mechanical integrity to the electrolyte layer. In this regard, several materials may be used as the electrolyte support structure, examples of which include polyvinylidene fluoride, polyurethane, poly(vinyl alcohol) (PVA), polybenzimidizol, (PBI), and gels with ceramic particulate additives such as fumed silica, nafion, and combinations thereof.

The electrolyte active species dispersed within the polymeric support structure may be either an acid or a base and is preferably a proton conducting species such as $H_2SO_4$, $H_3PO_4$, HCl, $HNO_3$, and combinations thereof. In one particularly preferred embodiment, the polymeric support structure is fabricated of either PVA or PBI and has dispersed therein $H_3PO_4$. This electrolyte layer is disclosed in commonly assigned copending U.S. patent application Ser. No. 08/547,821 now U.S. Pat. No. 5,587,872 to Lian, et al; and Ser. No. 08/641,716 to Li, et al, the disclosures of which are incorporated herein by reference.

The leaded contacts 24–32 are coupled to tabs which extend from the current collecting layer of each subassembly. The tabs are part of the current collector and thus do not have to be attached externally. The stacked capacitor subassemblies are further arranged by using current collector substrates with electrodes disposed on both sides, and applied by disposing a thin layer of a solid electrolyte in between the two electrodes. Thus, for six stacked devices, there are a total of seven current collectors, with leaded pins extending therefrom.

Thereafter, the entire package may be overmolded in a manner well known in the art so as to both protect the electrolyte active species from seepage or drying, as well as to provide structural integrity to the overall device. Overmolding in this manner is well known in the art.

Figure 4:
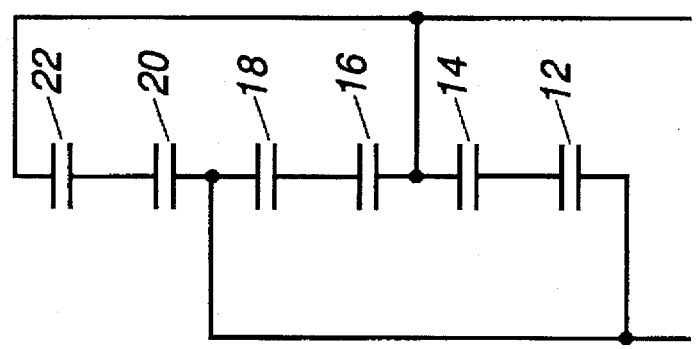
Figure 3:
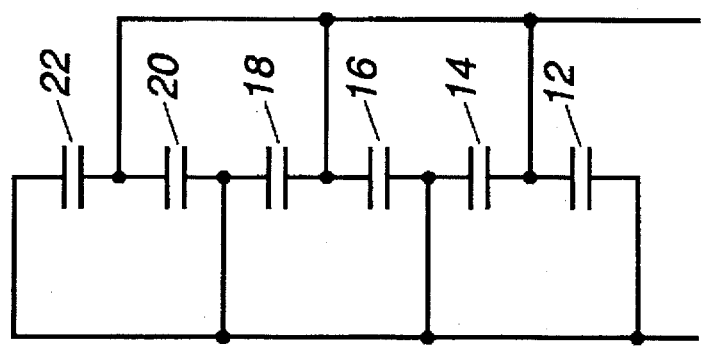

Referring now to FIGS. 3, 4 and 5, there is illustrated therein electrical circuit diagrams for a chip capacitor as illustrated in FIGS. 1 and 2 hereinabove. The electrical circuit diagrams show a six capacitor subassembly chip capacitor arranged in a number of different manners in order to obtain a desired voltage and/or capacitance. FIGS. 3–5 illustrate a series of electrical circuits in which the connections between each discrete subassembly is slightly modified. Using the examples of FIGS. 3–5, and assuming the capacitance of a single cell is $C_0$, the voltage is $V_0$, and the equivalent series resistance (ESR) is $R_0$, for a series configuration of n cells the equivalent capacitance will be $C_1/n$, the ESR will be $nR_2$, and the voltage will be $nV_2$. For a parallel configuration, the equivalent capacitance will be $nC_2$, the ESR will be $R_2/n$ and the voltage will be $V_2$. Then for FIG. 3, electrically coupling the capacitor subassemblies as shown therein yields a device with a series configuration of 6 capacitors, which will have a capacitance of $6C_0$, a device voltage of $1V_0$ and ESR of $R_0/6$. Similarly, and referring now to FIG. 4, the second arrangement yields a device with a parallel configuration of 3 segments each with 2 capacitors in series, which will have a capacitance of $3\times(C_0/2)=1.5C_0$, a device voltage of $2\times V_0$, $=2V_0$, and ESR equal to $(2\times R_0)/3)=0.67R_0$. Finally, the arrangement illustrated in FIG. 5 is a result of the device with a parallel configuration of 2 segments each with 3 capacitors in series, which will have a capacitance of $2\times(C_0/3)=0.67C_0$, device voltage of $3\times V_0$ and ESR of $3\times R_0)/2=1.5R_0$. Thus one such assembly of n such capacitors can result in a capacitance in the range $C_0/n$ to $nC_0$, an ESR in the range $R_0/n$ to $nR_0$ and a voltage $V_0$ to $nV_0$. For n=100, an assembly quite possible to fabricate with the film form, the capacitance range available for $C_{0=100}$ mF, is from 1 mF to 10 F.

Accordingly, it will become apparent to one that by using the device disclosed herein, and by using surface mount technology wherein each lead is electrically connected to a series of electrically conductive paths, a single device may meet the requirements of an application device, having numerous voltage and capacitance requirements. The major advantage of the device disclosed herein is that it offers a wide range of selection of capacitance, ESR and voltage values from one single device and hence can be dynamically tuned to meet the requirements of an application. By being tuned, or tunable refers to the fact that the device can be adjusted or adapted, which is operative and already mounted on a circuit board to respond to varying demands for voltage capacitance and/or ESR. This will have the beneficial advantage of reducing substantially the number of discrete capacitor devices necessary for a particular application device as well as allowing for easy mounting via surface mount technology.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A leaded chip capacitor device, capacitor device comprising a plurality of capacitor subassemblies arranged in a stacked configuration, each capacitor sub-assembly having at least one lead pin electrically coupled thereto.

2. A leaded chip capacitor device as in claim 1, wherein said capacitor sub-assemblies are electrochemical capacitor subassemblies.

3. A leaded chip capacitor device as in claim 2, wherein each said capacitor subassembly includes an anode, a cathode, and an electrolyte disposed therebetween.

4. A leaded chip capacitor device as in claim 3, wherein said anode and said cathode are fabricated of the same material.

5. A leaded chip capacitor device as in claim 3, wherein said anode and said cathode are fabricated of different materials.

6. A leaded chip capacitor device as in claim 3, wherein at least one of said anode and said cathode are fabricated of an oxide of Ru, Ir, Ta, Rh, Co, Ni, Mo, W, V, Ti, Cr, Mn, Pd, Cu, Ag, Re, Os, Pt, and combinations thereof.

7. A leaded chip capacitor device as in claim 3, wherein said electrolyte comprises a proton conducting electrolyte active species disposed in a polymeric support structure.

8. A variable voltage, variable current electrochemical capacitor device comprising a plurality of stacked capacitor sub-assemblies, each capacitor subassembly comprising a layer of anode material disposed upon a first current collecting substrate having a lead pin extending therefrom, a layer cathode material disposed upon a second current collecting substrate having a lead pin extending therefrom, and a layer of electrolyte material disposed between said layers of anode and cathode material, wherein different voltages or currents may be realized by effecting an electrical connection to the lead pin of said capacitor subassemblies.

9. A capacitor device as in claim 8, wherein said anode material and said cathode are fabricated of the same material.

10. A capacitor device as in claim 8, wherein said anode material and said cathode material are fabricated of different materials.

11. A capacitor device as in claim 8, wherein at least one of said anode and said cathode material are fabricated of an oxide of Ru, Ir, Ta, Rh, Co, Ni, Mo, W, V, Ti, Cr, Mn, Pd, Cu, Ag, Re, Os, Pt, Au, oxides thereof, and combinations thereof.

12. A capacitor device as in claim 8, wherein said electrolyte comprises a proton conducting electrolyte active species disposed in a polymeric support structure.

* * * * *